(12) United States Patent
Sohn et al.

(10) Patent No.: US 8,531,625 B2
(45) Date of Patent: Sep. 10, 2013

(54) LIGHT GUIDE PLATE FOR DISPLAYING THREE-DIMENSIONAL IMAGE, AND THREE-DIMENSIONAL IMAGE DISPLAY APPARATUS EMPLOYING THE SAME

(75) Inventors: Byung-hee Sohn, Yongin-si (KR);
Young-hwan Kim, Seongnam-si (KR);
Hong-seok Lee, Seongnam-si (KR);
Hee-kyung Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 12/969,838

(22) Filed: Dec. 16, 2010

(65) Prior Publication Data
US 2011/0149202 A1 Jun. 23, 2011

(30) Foreign Application Priority Data
Dec. 17, 2009 (KR) .................. 10-2009-0126386

(51) Int. Cl.
*G02F 1/1335* (2006.01)
(52) U.S. Cl.
USPC ........... 349/62; 349/64; 349/61; 349/65; 362/615; 362/613; 362/618; 362/607; 977/902
(58) Field of Classification Search
USPC .......... 349/62, 61, 65; 362/615, 613, 618, 362/625, 607
See application file for complete search history.

(56) References Cited

U.S. PATENT DOCUMENTS

| | | | |
|---|---|---|---|
| 6,752,505 B2 * | 6/2004 | Parker et al. | 362/627 |
| 7,477,220 B2 | 1/2009 | Muto | |
| 7,576,805 B2 * | 8/2009 | Ito et al. | 349/15 |
| 2005/0073625 A1 * | 4/2005 | Daiku et al. | 349/64 |
| 2005/0264717 A1 * | 12/2005 | Chien et al. | 349/61 |
| 2008/0084518 A1 * | 4/2008 | Brott et al. | 349/65 |
| 2008/0131667 A1 | 6/2008 | King et al. | |
| 2010/0157625 A1 * | 6/2010 | Mai et al. | 362/613 |
| 2010/0165254 A1 * | 7/2010 | Lee et al. | 349/65 |
| 2011/0002142 A1 * | 1/2011 | Yuuki et al. | 362/606 |
| 2011/0044073 A1 * | 2/2011 | Gourlay | 362/607 |
| 2011/0090713 A1 * | 4/2011 | Chen et al. | 362/612 |
| 2011/0110116 A1 * | 5/2011 | Peiler | 362/612 |
| 2011/0310332 A1 * | 12/2011 | Boyd et al. | 349/65 |

FOREIGN PATENT DOCUMENTS

| | | |
|---|---|---|
| JP | 2005-321754 | 11/2005 |
| JP | 2007-240559 | 9/2007 |
| KR | 10-2005-0033470 | 4/2005 |

OTHER PUBLICATIONS

Chu, Yu-Mioun, et al. "3-D mobile display based on dual-directional light guides with a fast-switching liquid-crystal panel." *Journal of the Society for Information Display* 13.10 (2005): 875-879.

Chien, Ko-Wei, et al. "53.2: 3D Mobile Display Based on Sequentially Switching Backlight with Focusing Foil." *SID Symposium Digest of Technical Papers*. vol. 35. No. 1. Blackwell Publishing Ltd, 2004: 1434-1437.

* cited by examiner

*Primary Examiner* — Edward Glick
*Assistant Examiner* — Sang V Nguyen
(74) *Attorney, Agent, or Firm* — NSIP Law

(57) ABSTRACT

A light guide plate for displaying a three-dimensional (3D) image, and a 3D image display apparatus employing the same. The light guide plate includes a transparent body formed in a flat panel shape, and for guiding light with total internal reflection in the transparent body; and a plurality of viewing zone separation units aligned inside the transparent body. Light incident on two side surfaces of the light guide plate is separated into different viewing zones by reflective surfaces of the viewing zone separation units.

22 Claims, 5 Drawing Sheets

LIGHT GUIDE PLATE FOR DISPLAYING THREE-DIMENSIONAL IMAGE, AND THREE-DIMENSIONAL IMAGE DISPLAY APPARATUS EMPLOYING THE SAME

CROSS-REFERENCE TO RELATED APPLICATION(S)

This application claims the benefit under 35 U.S.C. §119 (a) of Korean Patent Application No. 10-2009-0126386, filed on Dec. 17, 2009, in the Korean Intellectual Property Office, the disclosure of which is incorporated herein in its entirety by reference for all purposes.

BACKGROUND

1. Field

The following description relates to light guide plates for displaying a three-dimensional (3D) image, and 3D image display apparatuses employing the same.

2. Description of the Related Art

A three-dimensional (3D) image display apparatus using a two-dimensional (2D) display panel such as a liquid crystal display (LCD) panel includes a stereoscopic type display apparatus and an autostereoscopic type display apparatus. The stereoscopic type display apparatus uses, for example, polarized glasses or liquid crystal shutter glasses. Meanwhile, as the autostereoscopic type display apparatus, an apparatus using a lenticular lens or an apparatus using a parallax barrier is suggested.

For example, in the 3D image display apparatus using a lenticular lens, the lenticular lens in which a plurality of cylinder lens having a small pitch are aligned is positioned in front of a 2D display panel and image on a 2D display panel are divided into viewing zones in a horizontal direction by the lenticular lens. As such, a viewer may view different 2D images having binocular parallax through left and right eyes which are positioned in viewing zones and thus may experience a 3D effect.

SUMMARY

Provided are light guide plates for displaying a three-dimensional (3D) image, capable of being easily manufactured at low costs and providing a variety of optical designs, and 3D image display apparatuses employing the light guide plates.

Additional aspects will be set forth in part in the description which follows and, in part, will be apparent from the description, or may be learned by practice of the presented embodiments.

According to an aspect, a light guide plate for displaying a three-dimensional (3D) image includes a transparent body formed in a flat panel shape, having two opposite side surfaces on which a first incident surface and a second incident surface are formed, having a front surface on which an exit surface is formed, and for guiding light with total internal reflection in the transparent body; and a plurality of viewing zone separation units aligned adjacent to the exit surface inside the transparent body, wherein each of the plurality of viewing zone separation units comprises a first reflective surface inclined with respect to the first incident surface, and a second reflective surface extending inclined with respect to the second incident surface, such that first light incident through the first incident surface and propagated with the total internal reflection in the transparent body is reflected on the first reflective surface to be emitted through the exit surface, and that second light incident on the second incident surface and propagated with the total internal reflection in the transparent body is reflected on the second reflective surface to be emitted through the exit surface, thereby separating the first light and the second light into different viewing zones.

The plurality of viewing zone separation units may have a refractive index less than that of the transparent body.

The plurality of viewing zone separation units may be formed of air, metal, or a transparent polymer having a refractive index less than that of the transparent body.

Each of the plurality of viewing zone separation units may have a triangular or trapezoidal cross-section having straight or curved oblique sides.

A bottom side of the cross-section of each of the plurality of viewing zone separation units may have a length of about 0.1 µm to about 100 µm.

A gap between the plurality of viewing zone separation units may be about 0.1 µm to about 300 µm.

The plurality of viewing zone separation units may have a refractive index greater than that of the transparent body.

Each of the plurality of viewing zone separation units may have an inverted triangular or inverted trapezoidal cross-section having straight or curved oblique sides.

A top side of the cross-section of each of the plurality of viewing zone separation units may have a length of about 0.1 µm to about 100 µm.

A gap between the plurality of viewing zone separation units may be about 0.1 µm to about 500 µm.

The first reflective surface of each of the plurality of viewing zone separation units may be a flat surface having an inclination angle that varies according to a location of the first reflective surface from the first incident surface, and the second reflective surface of each of the plurality of viewing zone separation units may be a flat surface having an inclination angle that varies according to a location of the second reflective surface from the second incident surface.

The inclination angles of the first and second reflective surfaces of each of the plurality of viewing zone separation units may be about 10° to about 80°.

The first reflective surface of each of the plurality of viewing zone separation units may be a curved surface having a curvature that varies according to a location of the first reflective surface from the first incident surface, and the second reflective surface of each of the plurality of viewing zone separation units may be a curved surface having a curvature that varies according to a location of the second reflective surface from the second incident surface.

The plurality of viewing zone separation units may have a symmetrical structure with respect to a center between the first and second incident surfaces.

The plurality of viewing zone separation units may be spaced apart from each other by an equal alignment distance.

A lenticular lens surface comprising a plurality of semi-cylindrical lenses extending in a direction parallel with a lengthwise direction of the plurality of viewing zone separation units may be formed on the exit surface of the transparent body.

A light guide pattern for uniformly guiding the first light and the second light may be formed on a surface of the transparent body opposite the exit surface.

The light guide plate may be flexible.

According to another aspect, a three-dimensional (3D) image display apparatus includes a light guide plate comprising a transparent body formed in a flat panel shape, having two opposite side surfaces on which a first incident surface and a second incident surface are formed, having a front surface on which an exit surface is formed, and for guiding light with total internal reflection in the transparent body, and a plurality of viewing zone separation units aligned adjacent to the exit surface inside the transparent body; a light source unit comprising a first light source disposed adjacent to the first incident surface of the light guide plate, and a second light source disposed adjacent to the second incident surface of the light guide plate; and a display panel disposed on the exit surface of the light guide plate, wherein each of the plurality of viewing zone separation units comprises a first reflective surface inclined with respect to the first incident surface, and a second reflective surface inclined with respect to the second incident surface, such that first light incident through the first incident surface and propagated with the total internal reflection in the transparent body is reflected on the first reflective surface to be emitted through the exit surface, and that second light incident on the second incident surface and propagated with the total internal reflection in the transparent body is reflected on the second reflective surface to be emitted through the exit surface, thereby separating the first light and the second light into different viewing zones.

The first and second light sources may alternately emit light to display a 3D image and may simultaneously emit light to display a two-dimensional (2D) image.

Other features and aspects may be apparent from the following detailed description, the drawings, and the claims.

Figure 1:
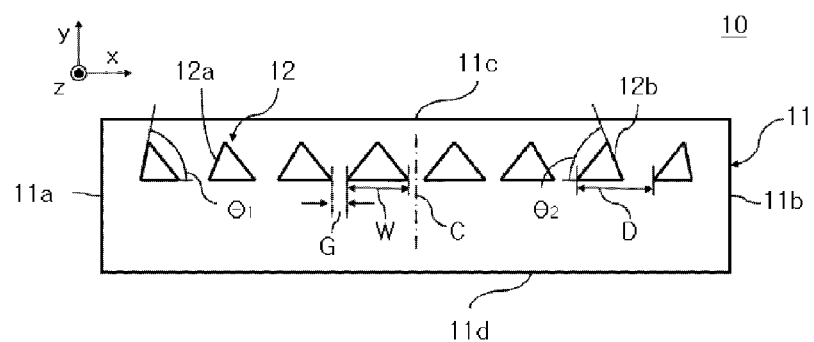
FIG. 1 is a cross-sectional view of a light guide plate for displaying a three-dimensional (3D) image, according to an embodiment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 is a cross-sectional view of a light guide plate 10 for displaying a three-dimensional (3D) image, according to an embodiment.

Referring to FIG. 1, the light guide plate 10 includes a transparent body 11, and a plurality of viewing zone separation units 12 buried inside the transparent body 11.

The transparent body 11 guides light with total internal reflection in the transparent body 11, and may be formed of, for example, a transparent and flexible polymer.

The transparent body 11 may be formed in a rectangular flat panel shape on an x-z plane. A first incident surface 11a and a second incident surface 11b are formed on two opposite side surfaces of the transparent body 11, and an exit surface 11c is formed on a front surface of the transparent body 11. A rear surface 11d of the transparent body 11 is a surface for totally internally reflecting incident light in the transparent body 11. The transparent body 11 may be formed in the form of a film having a thickness of, for example, several hundred μm.

The viewing zone separation units 12 are aligned adjacent to the exit surface 11c inside the transparent body 11. Each of the viewing zone separation units 12 includes a first reflective surface 12a extending in a direction parallel with a lengthwise direction of the first incident surface 11a, and a second reflective surface 12b extending in a direction parallel with a lengthwise direction of the second incident surface 11b. The first reflective surface 12a is inclined with respect to the first incident surface 11a, and the second reflective surface 12b is inclined with respect to the second incident surface 11b. The viewing zone separation units 12 may have a refractive index less than that of the transparent body 11. For example, the viewing zone separation units 12 may be formed of a transparent polymer having a refractive index less than that of the transparent body 11. As such, light that reaches the first or second reflective surface 12a or 12b may be totally internally reflected due to a difference in refractive index, may have a variation in incidence angle toward the exit surface 11c according to the reflection on the first or second reflective surface 12a or 12b, and thus may be emitted through the exit surface 11c. The viewing zone separation units 12 may also be vacant portions which may be understood to be formed of air having a refractive index less than that of the transparent body 11. The viewing zone separation units 12 may also be formed of metal having reflectability. In this case, the first or second reflective surface 12a or 12b reflects light due to the reflectability of metal.

In the current embodiment, the lengthwise direction of the first or second incident surface 11a or 11b is a z direction. The viewing zone separation units 12 have a prism shape having a triangular cross-section on an x-y plane and extending in the z direction. In this case, a length W of a bottom side of the cross-section of the viewing zone separation units 12 may be about 0.1 μm to about 100 μm, and a gap G between the viewing zone separation units 12 may be about 0.1 μm to about 300 μm. Meanwhile, the viewing zone separation units 12 may be spaced apart from each other by an equal alignment distance D along a direction perpendicular to the first incident surface 11a (i.e., an x direction). The length W of the bottom side of, and the gap G and the alignment distance D between the viewing zone separation units 12 are related to a pixel size and a resolution of a display panel 17 (see FIG. 2) of a display apparatus, and may vary according to an optical design.

In order to separate viewing zones, in the viewing zone separation units 12, an inclination angle $\theta_1$ of the first reflective surface 12a varies according to a location of the first reflective surface 12a from the first incident surface 11a, and an inclination angle $\theta_2$ of the second reflective surface 12b varies according to a location of the second reflective surface 12b from the second incident surface 11b. The viewing zone separation units 12 may have a symmetrical structure with respect to a central surface C between the first and second incident surfaces 11a and 11b. That is, the inclination angle $\theta_1$ of the first reflective surface 12a spaced apart from the first incident surface 11a by a predetermined distance may equal to the inclination angle $\theta_2$ of the second reflective surface 12b spaced apart from the second incident surface 11b by the same distance. The inclination angles $\theta_1$ and $\theta_2$ of the first and second reflective surfaces 12a and 12b may vary according to materials of the transparent body 11 and the viewing zone separation units 12, or an optimal location of a viewer. The inclination angles $\theta_1$ and $\theta_2$ of the first and second reflective surfaces 12a and 12b may be about 10° to about 80°. For example, if the transparent body 11 has a refractive index of 1.4 to 1.5 and the viewing zone separation units 12 are formed as empty spaces, that is, formed of air, the inclination angles $\theta_1$ and $\theta_2$ of the first and second reflective surfaces 12a and 12b may be about 50° to about 65°.

By forming the viewing zone separation units 12 integrally to the transparent body 11, the light guide plate 10 may simplify a manufacturing process and may prevent a reduction in adhesion between the viewing zone separation units 12 and the transparent body 11. Also, since the light guide plate 10 functions as a prism sheet, an additional prism sheet may not be required and thus a manufacturing cost may be reduced.

Figure 2:
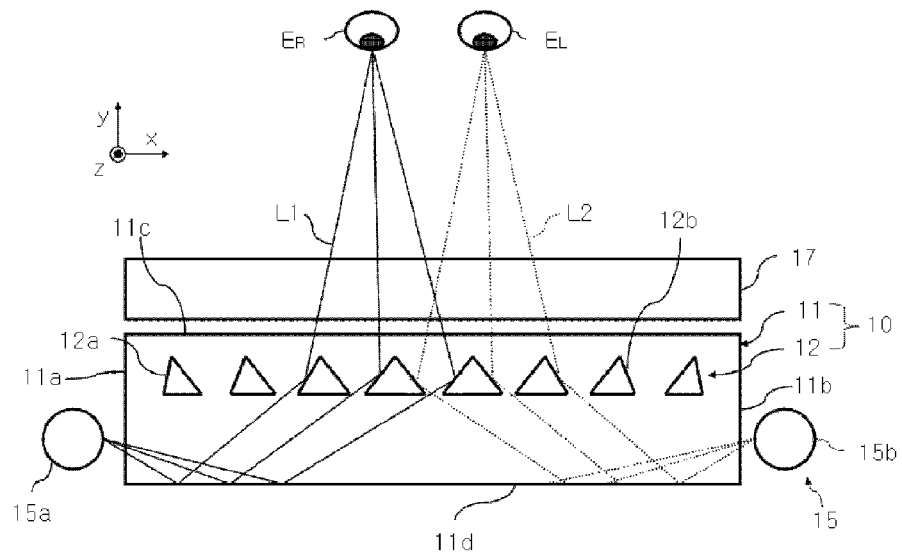
FIG. 2 is a cross-sectional view of a 3D image display apparatus employing the light guide plate illustrated in FIG. 1, according to an embodiment.

FIG. 2 is a cross-sectional view of a 3D image display apparatus employing the light guide plate 10 illustrated in FIG. 1, according to an embodiment.

Referring to FIGS. 1 and 2, the 3D image display apparatus includes the light guide plate 10, a light source unit 15, and the display panel 17.

The light source unit 15 includes a first light source 15a disposed adjacent to the first incident surface 11a of the light guide plate 10, and a second light source 15b disposed adjacent to the second incident surface 11b of the light guide plate 10.

First light L1 emitted from the first light source 15a and second light L2 emitted from the second light source 15b enter the transparent body 11, propagate with the total internal reflection, are reflected on the first and second reflective surfaces 12a and 12b of the viewing zone separation units 12 to break the total internal reflection condition, and are emitted through the exit surface 11c of the transparent body 11. The first reflective surface 12a of each of the viewing zone separation units 12 reflects the first light L1 that enters through the first incident surface 11a and propagates with the total internal reflection in the transparent body 11 so as to allow the first light L1 to be emitted through the exit surface 11c. Furthermore, the inclination angle $\theta_1$ of the first reflective surface 12a is designed in such a way that the reflected first light L1 proceeds toward a right eye $E_R$ of a viewer. Likewise, the second reflective surface 12b of each of the viewing zone separation units 12 reflects the second light L2 that enters through the second incident surface 11b and propagates with the total internal reflection in the transparent body 11 so as to allow the second light L2 to be emitted through the exit surface 11c. Furthermore, the inclination angle $\theta_2$ of the second reflective surface 12b is designed in such a way that the reflected second light L2 proceeds toward a left eye $E_L$ of the viewer.

The display panel 17 may be a device on which a two-dimensional (2D) image is displayed, and may be, for example, a transmissive display panel such as a liquid crystal panel, a polymer dispersed liquid crystal panel, an electrowetting display panel, or an electrochromic display panel.

Operation of the 3D image display apparatus will now be described.

The 3D image display apparatus is a display apparatus capable of being switched between a 2D mode and a 3D mode.

In the 3D mode, the display panel 17 alternately displays right-eye and left-eye images, and the first and second light sources 15a and 15b alternately emit light in synchronization with the right-eye and left-eye images alternately displayed on the display panel 17. That is, when the display panel 17 displays the right-eye image, only the first light source 15a emits the first light L1, the emitted first light L1 proceed toward the right eye $E_R$ of the viewer by the viewing zone separation units 12 of the light guide plate 10, and thus the viewer may recognize the right-eye image with the right eye $E_R$. Also, when the display panel 17 displays the left-eye image, only the second light source 15b emits the second light L2, the emitted second light L2 proceeds toward the left eye $E_L$ of the viewer by the viewing zone separation units 12 of the light guide plate 10, and thus the viewer may recognize the left-eye image with the left eye $E_L$. In this case, the right-eye and left-eye images are generated with a binocular parallax corresponding to a distance between the right and left eyes $E_R$ and $E_L$ of the viewer, and the viewer may recognize an image three-dimensionally due to the binocular parallax between the right-eye image recognized with the right eye $E_R$ and the left-eye image recognized by the left eye $E_L$.

In the 2D mode, the first and second light sources 15a and 15b simultaneously emit light and the display panel 17 displays a 2D image. As a result, the viewer recognizes the 2D image simultaneously with the right and left eyes $E_R$ and $E_L$. In this case, since no binocular parallax occurs, the viewer recognizes an image two-dimensionally.

Figure 3A:
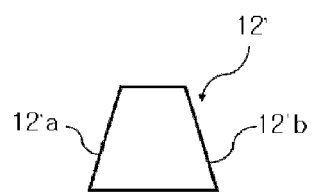
FIGS. 3A and 3B are cross-sectional views of viewing zone separation units according to modified examples of FIG. 1.
Figure 3B:
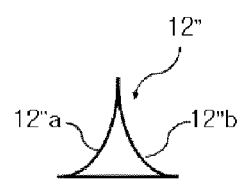

Although the viewing zone separation units 12 have a prism shape having a triangular cross-section in FIG. 1, the viewing zone separation units 12 are not limited thereto. FIGS. 3A and 3B are cross-sectional views of viewing zone separation units 12' and 12" according to modified examples of FIG. 1.

Referring to FIG. 3A, the viewing zone separation unit 12' may have a modified prism shape having a trapezoidal cross-section. In this case, a first reflective surface 12'a and a second reflective surface 12'b of the viewing zone separation unit 12' are the same as the first and second reflective surfaces 12a and 12b illustrated in FIG. 1.

Referring to FIG. 3B, the viewing zone separation unit 12" may have a modified prism shape in which a first reflective surface 12"a and a second reflective surface 12"b are curved surfaces.

In this case, a curvature of the first reflective surface 12"a may vary according to a location of the first reflective surface 12"a from the first incident surface 11a illustrated in FIG. 1, and a curvature of the second reflective surface 12"b may vary according to a location of the second reflective surface 12"b from the second incident surface 11b illustrated in FIG. 1. Here, the curvatures of the first and second reflective surfaces 12"a and 12"b may vary according to the materials of the transparent body 11 illustrated in FIG. 1 and the viewing zone separation unit 12", or an optimal location of a viewer.

Figure 4:
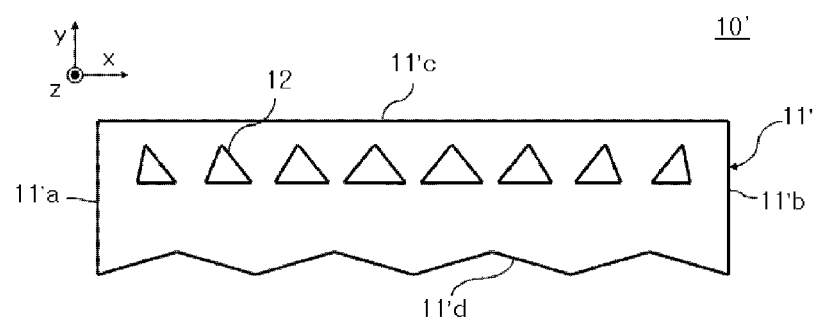
FIG. 4 is a cross-sectional view of a light guide plate according to a modified example of FIG. 1.

Meanwhile, although the rear surface 11d of the transparent body 11 is flat in FIG. 1, the rear surface 11d is not limited thereto. FIG. 4 is a cross-sectional view of a light guide plate 10' according to a modified example of FIG. 1 when a rear surface 11'd of a transparent body 11' has a predetermined light guide pattern. The light guide pattern of the rear surface 11'd allows light entering the transparent body 11' to be totally internally reflected and then uniformly guided. The light guide pattern may be symmetrically between a first incident surface 11'a and a second incident surface 11'b of the transparent body 11'. The above light guide pattern is well known in the art and thus a detailed description thereof will not be provided here.

Figure 5:
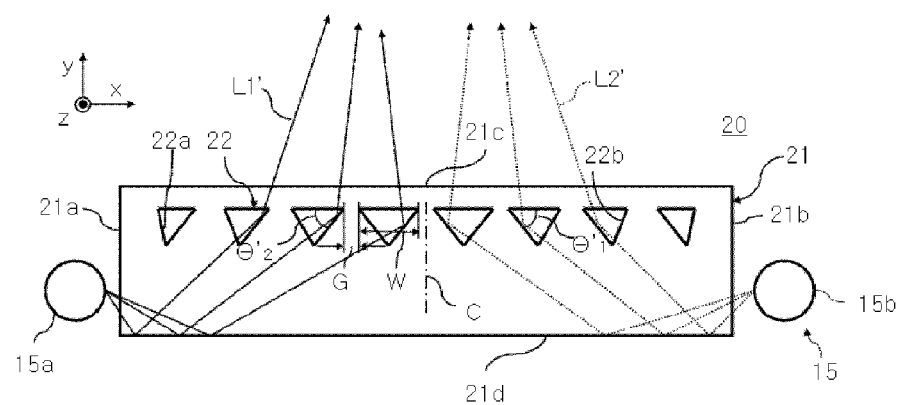
FIG. 5 is a cross-sectional view of a light guide plate for displaying a 3D image, according to another embodiment.

FIG. 5 is a cross-sectional view of a light guide plate 20 for displaying a 3D image, according to another embodiment.

Referring to FIG. 5, the light guide plate 20 includes a transparent body 21, and a plurality of viewing zone separation units 22 buried in the transparent body 21.

The transparent body 21 is a flat light guide sheet that guides light with total internal reflection in the transparent body 21, and may be formed of, for example, a transparent and flexible polymer.

The viewing zone separation units 22 are aligned adjacent to an exit surface 21c inside the transparent body 21. The viewing zone separation units 22 may be formed of a transparent polymer having a refractive index greater than that of the transparent body 21. Each of the viewing zone separation units 22 includes a first reflective surface 22a extending in a direction parallel with a lengthwise direction of a first incident surface 21a of the transparent body 21, and a second reflective surface 22b extending in a direction parallel with a lengthwise direction of a second incident surface 21b of the transparent body 21. Since the viewing zone separation units 22 are formed of a transparent polymer having a refractive index greater than that of the transparent body 21, light that reaches the viewing zone separation units 22 enters the viewing zone separation units 22 and is reflected on interfaces with total internal reflection. For example, first light L1' emitted from a first light source 15a of the light source unit 20 enters each of the viewing zone separation units 22, is reflected on the second reflective surface 22b with total internal reflection, and is emitted through the exit surface 21c. Second light L2' emitted from a second light source 15b of the light source unit 20 enters each of the viewing zone separation units 22, is reflected on the first reflective surface 22a with total internal reflection, and is emitted through the exit surface 21c. Accordingly, light reflected on the first and second reflective surfaces 22a and 22b is opposite to the light reflected on the first and second reflective surfaces 12a and 12b illustrated in FIG. 1.

The viewing zone separation units 22 have an inverted prism shape having an inverted triangular cross-section and extending in a z direction. In this case, a length W of a top side of the cross-section of the viewing zone separation units 22 may be about 0.1 μm to about 100 μm, and a gap G between the viewing zone separation units 22 may be about 0.1 μm to about 500 μm. In order to separate viewing zones, in the viewing zone separation units 22, an inclination angle $\theta'_1$ of the first reflective surface 22a varies according to a location of the first reflective surface 22a from the second incident surface 21b, and an inclination angle $\theta'_2$ of the second reflective surface 22b varies according to a location of the second reflective surface 22b from the first incident surface 21a. The viewing zone separation units 22 may have a symmetrical structure with respect to a central surface C between the first and second incident surfaces 21a and 21b. The inclination angles $\theta'_1$ and $\theta'_2$ of the first and second reflective surfaces 22a and 22b may vary according to materials of the transparent body 21 and the viewing zone separation units 22, or an optimal location of a viewer. The inclination angles $\theta'_1$ and $\theta'_2$ of the first and second reflective surfaces 22a and 22b may be about 10° to about 80°.

Figure 6A:
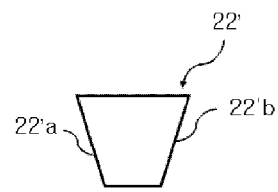
FIGS. 6A and 6B are cross-sectional views of viewing zone separation units according to modified examples of FIG. 5.
Figure 6B:
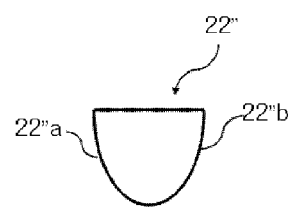

Although the viewing zone separation units 22 have an inverted prism shape having an inverted triangular cross-section in FIG. 5, the viewing zone separation units 22 are not limited thereto. FIGS. 6A and 6B are cross-sectional views of viewing zone separation units 22' and 22" according to modified examples of FIG. 5.

Referring to FIG. 6A, the viewing zone separation unit 22' may have a modified prism shape having an inverted trapezoidal cross-section. In this case, a first reflective surface 22'a and a second reflective surface 22'b of the viewing zone separation unit 22' are the same as the first and second reflective surfaces 22a and 22b illustrated in FIG. 5.

Referring to FIG. 6B, the viewing zone separation unit 22" may have a modified prism shape in which a first reflective surface 22"a and a second reflective surface 22"b are curved surfaces. In this case, a curvature of the first reflective surface 22"a may vary according to a location of the first reflective surface 22"a from the second incident surface 21b illustrated in FIG. 5, and a curvature of the second reflective surface 22"b may vary according to a location of the second reflective surface 22"b from the first incident surface 21a illustrated in FIG. 5.

Figure 7:
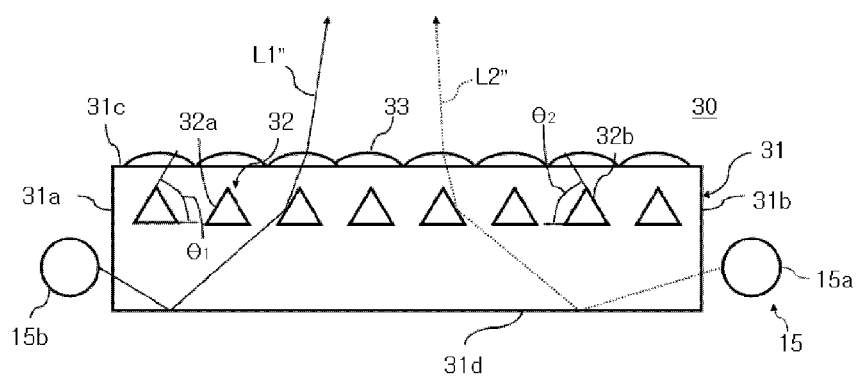
FIG. 7 is a cross-sectional view of a light guide plate for displaying a 3D image, according to another embodiment.

FIG. 7 is a cross-sectional view of a light guide plate 30 for displaying a 3D image, according to another embodiment.

Referring to FIG. 7, the light guide plate 30 includes a transparent body 31, a plurality of viewing zone separation units 32 buried in the transparent body 31, and a lenticular lens surface 33 formed on an exit surface 31c of the transparent body 31.

The transparent body 31 is a flat light guide sheet that guides light with total internal reflection in the transparent body 31, and may be formed of, for example, a transparent and flexible polymer.

The viewing zone separation units 32 are aligned adjacent to the exit surface 31c inside the transparent body 31. Each of the viewing zone separation units 32 includes a first reflective surface 32a extending in a direction parallel with a lengthwise direction of a first incident surface 31a of the transparent body 31, and a second reflective surface 32b extending in a direction parallel with a lengthwise direction of a second incident surface 31b of the transparent body 31. The viewing zone separation units 32 may have a refractive index less than that of the transparent body 31. For example, the viewing zone separation units 32 may be formed of a transparent polymer having a refractive index less than that of the transparent body 31. The viewing zone separation units 32 may also be formed of air or metal. The viewing zone separation units 32 have a prism shape having a triangular cross-section on an x-y plane and extending in a z direction.

The lenticular lens surface 33 includes an array of a plurality of semi-cylindrical lenses extending in a direction parallel with a lengthwise direction of the viewing zone separation units 32 on the exit surface 31c of the transparent body 31. Together with the viewing zone separation units 32, the lenticular lens surface 33 separates light to be emitted from the light guide plate 30 into different viewing zones. In this case an inclination angle $\theta''_1$ of the first reflective surface 32a and an inclination angle $\theta''_2$ of the second reflective surface 32b may be constantly maintained regardless of locations of the first and second reflective surface 32a and 32b from the first and second incident surfaces 31a and 31b.

By forming the viewing zone separation units 32 and the lenticular lens surface 33 integrally to the transparent body 31, the light guide plate 30 may simplify a manufacturing process and may prevent a reduction in adhesion between the viewing zone separation units 32, the lenticular lens surface 33, and the transparent body 31. Also, since the light guide plate 30 functions as a prism sheet, an additional prism sheet may not be required and thus a manufacturing cost may be reduced.

Figure 8:
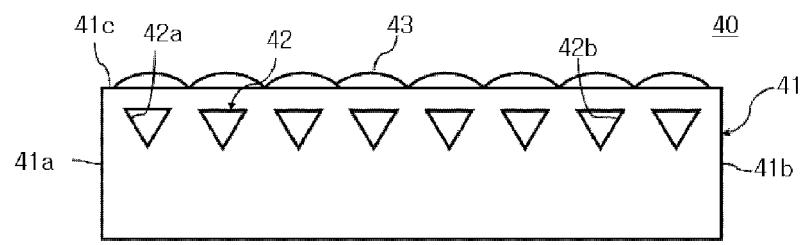
FIG. 8 is a cross-sectional view of a light guide plate for displaying a 3D image, according to another embodiment.

FIG. 8 is a cross-sectional view of a light guide plate 40 for displaying a 3D image, according to another embodiment.

Referring to FIG. 8, the light guide plate 40 includes a transparent body 41, a plurality of viewing zone separation units 42 buried in the transparent body 41, and a lenticular lens surface 43 formed on an exit surface 41c of the transparent body 41.

The light guide plate 40 is the same as the light guide plate 30 illustrated in FIG. 7 except that the viewing zone separation units 42 are formed of a transparent polymer having a refractive index greater than that of the transparent body 41 and thus the shape of the viewing zone separation units 42 varies.

Since the viewing zone separation units 42 are formed of a transparent polymer having a refractive index greater than that of the transparent body 41, the viewing zone separation units 42 have an inverted prism shape having an inverted triangular cross-section and extending in a z direction. Together with the lenticular lens surface 43, the viewing zone separation units 42 separate light to be emitted from the light guide plate 40 into different viewing zones. The cross-section of the viewing zone separation units 42 may be constantly maintained regardless of locations of the viewing zone separation units 42 from first and second incident surfaces 41a and 41b.

Figure 9:
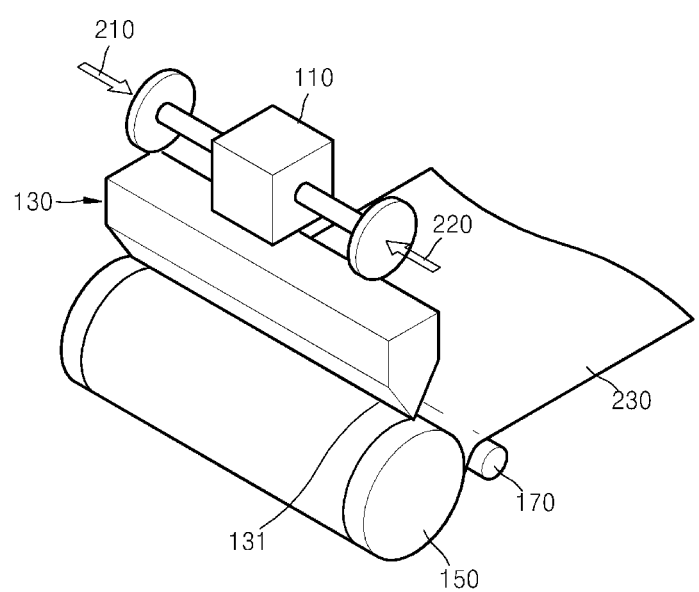
FIG. 9 is a perspective view for describing a process of manufacturing a light guide plate for displaying a 3D image, according to an embodiment.

FIG. 9 is a perspective view for describing a process of manufacturing a light guide plate for displaying a 3D image, according to an embodiment.

Referring to FIG. 9, a first polymer resin 210 for forming a body of the light guide plate, and a second polymer resin 220 for forming viewing zone separation units are provided to a feed block 110. The feed block 110 combines and stacks the first and second polymer resins 210 and 220 before they are sent to a die 130. For example, the feed block 110 may combine the first and second polymer resins 210 and 220 into a sheet of triple layers of the first polymer resin 210—the second polymer resin 220—the first polymer resin 210. In this case, the layer of the second polymer resin 220 has a cross-section corresponding to the cross-section of the viewing zone separation units 12, 12', 12", 22, 22', 22", 32, or 42 illustrated in FIGS. 1, 3A, 3B, 5, 6A, 6B, 7 or 8. The first and second polymer resins 210 and 220 combined by the feed block 110 are sent to the die 130, are extended in a widthwise direction, are extruded from a nozzle 131, and then are formed as a sheet through rollers 150 and 170.

As described above, according to one or more of the above embodiments, a light guide plate for displaying a 3D image may be manufactured by performing a very simple process at low costs.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A light guide plate for displaying a three-dimensional (3D) image, the light guide plate comprising:
a transparent body configured to guide internally reflected light, the transparent body formed in a flat panel shape, having two opposite side surfaces on which a first incident surface and a second incident surface are formed, and having a front surface on which an exit surface is formed; and
a plurality of viewing zone separation units aligned adjacent to the exit surface, wherein:
the transparent body has a single refractive index and envelops and contacts the entire external surface of each of the viewing zone separation units, and
each of the plurality of viewing zone separation units comprises a first reflective surface inclined with respect to the first incident surface, and a second reflective surface extending inclined with respect to the second incident surface, such that first light incident through the first incident surface and propagated with total internal reflection in the transparent body is reflected on the first reflective surface to be emitted through the exit surface, and that second light incident on the second incident surface and propagated with total internal reflection in the transparent body is reflected on the second reflective surface to be emitted through the exit surface, thereby separating the first light and the second light into different viewing zones.

2. The light guide plate of claim 1, wherein the plurality of viewing zone separation units have a refractive index less than that of the transparent body.

3. The light guide plate of claim 2, wherein the plurality of viewing zone separation units are formed of air, metal, or a transparent polymer having a refractive index less than that of the transparent body.

4. The light guide plate of claim 2, wherein each of the plurality of viewing zone separation units has a triangular or trapezoidal cross-section having straight or curved oblique sides.

5. The light guide plate of claim 4, wherein a bottom side of the cross-section of each of the plurality of viewing zone separation units has a length of about 0.1 μm to about 100 μm.

6. The light guide plate of claim 4, wherein a gap between the plurality of viewing zone separation units is about 0.1 μm to about 300 μm.

7. The light guide plate of claim 1, wherein the plurality of viewing zone separation units have a refractive index greater than that of the transparent body.

8. The light guide plate of claim 7, wherein each of the plurality of viewing zone separation units has an inverted triangular or inverted trapezoidal cross-section having straight or curved oblique sides.

9. The light guide plate of claim 8, wherein a top side of the cross-section of each of the plurality of viewing zone separation units has a length of about 0.1 μm to about 100 μm.

10. The light guide plate of claim 8, wherein a gap between the plurality of viewing zone separation units is about 0.1 μm to about 500 μm.

11. The light guide plate of claim 1, wherein the first reflective surface of each of the plurality of viewing zone separation units is a flat surface having an inclination angle that varies according to a location of the first reflective surface from the first incident surface, and
wherein the second reflective surface of each of the plurality of viewing zone separation units is a flat surface having an inclination angle that varies according to a location of the second reflective surface from the second incident surface.

12. The light guide plate of claim 11, wherein the inclination angles of the first and second reflective surfaces of each of the plurality of viewing zone separation units are about 10° to about 80°.

13. The light guide plate of claim 1, wherein the first reflective surface of each of the plurality of viewing zone separation units is a curved surface having a curvature that varies according to a location of the first reflective surface from the first incident surface, and wherein the second reflective surface of each of the plurality of viewing zone separation units is a curved surface having a curvature that varies according to a location of the second reflective surface from the second incident surface.

14. The light guide plate of claim 1, wherein the plurality of viewing zone separation units have a symmetrical structure with respect to a center between the first and second incident surfaces.

15. The light guide plate of claim 1, wherein the plurality of viewing zone separation units are spaced apart from each other by an equal alignment distance.

16. The light guide plate of claim 1, wherein a lenticular lens surface comprising a plurality of semi-cylindrical lenses extending in a direction parallel with a lengthwise direction of the plurality of viewing zone separation units is formed on the exit surface of the transparent body.

17. The light guide plate of claim 1, wherein a light guide pattern for uniformly guiding the first light and the second light is formed on a surface of the transparent body opposite the exit surface.

18. The light guide plate of claim 1, wherein the light guide plate is flexible.

19. A three-dimensional (3D) image display apparatus comprising: a light guide plate comprising:

a transparent body configured to guide internally reflected light, the transparent body formed in a flat panel shape, having two opposite side surfaces on which a first incident surface and a second incident surface are formed, and having a front surface on which an exit surface is formed, and a plurality of viewing zone separation units aligned adjacent to the exit surface;

a light source unit comprising a first light source disposed adjacent to the first incident surface of the light guide plate, and a second light source disposed adjacent to the second incident surface of the light guide plate; and a display panel disposed on the exit surface of the light guide plate, wherein:

the transparent body has a single refractive index and envelops and contacts the entire external surface of each of the viewing zone separation units, and each of the plurality of viewing zone separation units comprises a first reflective surface inclined with respect to the first incident surface, and a second reflective surface inclined with respect to the second incident surface, such that first light incident through the first incident surface and propagated with total internal reflection in the transparent body is reflected on the first reflective surface to be emitted through the exit surface, and that second light incident on the second incident surface and propagated with total internal reflection in the transparent body is reflected on the second reflective surface to be emitted through the exit surface, thereby separating the first light and the second light into different viewing zones.

20. The 3D image display apparatus of claim 19, wherein the first and second light sources alternately emit light to display a 3D image and simultaneously emit light to display a two-dimensional (2D) image.

21. The light guide plate o claim 1, wherein the transparent body is a unitary structure.

22. The apparatus of claim 19, wherein the transparent body is a unitary structure.

* * * * *